United States Patent
Cain et al.

(10) Patent No.: US 7,302,579 B1
(45) Date of Patent: Nov. 27, 2007

(54) PERFORMING BACKUP OPERATIONS TO PERIPHERAL DATA STORAGE SYSTEMS

(75) Inventors: William C. Cain, Foothill Ranch, CA (US); Matthew G. Rutledge, Brea, CA (US); Chinying Sun, Mission Viejo, CA (US); Kevin W. McLaughlin, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 821 days.

(21) Appl. No.: 10/816,348

(22) Filed: Mar. 31, 2004

(51) Int. Cl.
G06F 9/00 (2006.01)

(52) U.S. Cl. .................. 713/182; 713/193; 713/155

(58) Field of Classification Search ............. 713/182, 713/193, 155
See application file for complete search history.

(56) References Cited

U.S. PATENT DOCUMENTS

| | | |
|---|---|---|
| D308,515 S | 6/1990 | Stead |
| D308,517 S | 6/1990 | Horie |
| D309,294 S | 7/1990 | Sottsass |
| D313,015 S | 12/1990 | Ryan et al. |
| D335,489 S | 5/1993 | Sander |
| 5,263,668 A | 11/1993 | Reiter |
| 5,276,865 A | 1/1994 | Thorpe |
| 5,388,792 A | 2/1995 | Hastings et al. |
| D358,581 S | 5/1995 | Daniels |
| 5,469,573 A | 11/1995 | McGill, III et al. |
| D365,331 S | 12/1995 | Martin et al. |
| D366,464 S | 1/1996 | Martin |
| 5,657,455 A | 8/1997 | Gates et al. |
| 5,749,637 A | 5/1998 | McMahan et al. |
| 5,754,112 A | 5/1998 | Novak |
| 5,815,652 A | 9/1998 | Ote et al. |
| 5,887,962 A | 3/1999 | Tsai |
| 6,049,885 A | 4/2000 | Gibson et al. |
| 6,059,384 A | 5/2000 | Ho |
| 6,176,461 B1 | 1/2001 | Beaman et al. |
| 6,311,941 B1 | 11/2001 | Feldmeyer |

(Continued)

FOREIGN PATENT DOCUMENTS

JP 03-232012 10/1991

(Continued)

OTHER PUBLICATIONS

Hard Disk Info.—The Storage Authority, "Freecom FHD-1—The Intelligent Solution"; May 28, 2002, 2 pages.

*Primary Examiner*—Thomas R. Peeso

(57) ABSTRACT

A method of operating a peripheral data storage system (PDSS) for use with a host system configured to perform scheduled backup operations to PDSS comprising a user-actuated backup signaling subsystem(UBSS), a user-notifying device comprising first and second notifying states, and a host interface adapted for communication with the host system. The method comprises receiving a first signal from UBSS; communicating first signal to host system via host interface; receiving an acknowledgement signal from host system in response to communicating; and switching user-notifying device between first notifying state and second notifying state in response to received acknowledgement signal. Another method comprises receiving in host system a first request from PDSS for performing a task corresponding to a host-scheduled backup operation for a scheduled backing up of data to PDSS; completing the task by host system based on received first request; and notifying PDSS of completion of the task by host system.

58 Claims, 12 Drawing Sheets

U.S. PATENT DOCUMENTS

| | | |
|---|---|---|
| 6,374,363 B1 | 4/2002 | Wu et al. |
| 6,439,528 B1 | 8/2002 | Goto et al. |
| 6,688,708 B1 | 2/2004 | Janson |
| 6,892,288 B2 | 5/2005 | Serichol Blasco |
| 7,013,336 B1 | 3/2006 | King |
| 7,058,662 B2 | 6/2006 | Wiggins et al. |
| 7,114,067 B2 | 9/2006 | Sukigara |
| 7,117,276 B2 | 10/2006 | Maeda et al. |
| 2003/0163627 A1 | 8/2003 | Deng et al. |
| 2004/0010732 A1 | 1/2004 | Oka |
| 2004/0044649 A1 | 3/2004 | Yamato et al. |
| 2004/0136224 A1 | 7/2004 | Hamer et al. |
| 2004/0143684 A1 | 7/2004 | Cheng |
| 2005/0015477 A1 | 1/2005 | Chen |
| 2005/0044220 A1 | 2/2005 | Madhaven |
| 2005/0091425 A1 | 4/2005 | Wyatt et al. |
| 2005/0128626 A1 | 6/2005 | Suzuki et al. |
| 2005/0160213 A1 | 7/2005 | Chen |
| 2006/0277433 A1 | 12/2006 | Largman et al. |

FOREIGN PATENT DOCUMENTS

| | | | |
|---|---|---|---|
| WO | WO 2004/023262 A2 | 3/2004 | |

PERFORMING BACKUP OPERATIONS TO PERIPHERAL DATA STORAGE SYSTEMS

This invention relates to peripheral data storage systems. More particularly, the present invention is directed to a method for performing backup operations to peripheral data storage systems.

BACKGROUND OF THE INVENTION

External peripheral data storage systems such as external disk drives and card readers are standalone units that are commonly mounted to and communicate with a host computer, generally via an external cable such as a universal serial bus (USB) cable or Firewire™ cable.

One wide-spread use of an external peripheral data storage systems is for creating backups of data in the host system so to minimize the risk of a permanent loss or corruption of data due to a hardware or software damage to the host system. The backup operation may be an on-demand operation or a scheduled operation wherein the host system is configured to routinely backup data to the external peripheral data storage systems at pre-selected times, such as every midnight. In current products, however, every time a user desires to enable or disable a scheduled backup operation to an external peripheral data storage system, the user is required to access the host system in a multi-step process. Unfortunately, users may not perform the foregoing multi-step process for reasons such as unawareness of the procedural requirements or lack of technical know how, thus causing them to view the peripheral storage system as being overly complicated or inconvenient for use.

Accordingly, what is needed is a method for facilitating the performing of backup or backup-related operations by users for backing of data to peripheral data storage systems.

SUMMARY OF THE INVENTION

This invention can be regarded as a method of operating a peripheral data storage system for use with a host system configured to perform scheduled backup operations to the peripheral data storage system, the peripheral data storage system comprising a data storage device, a data storage system controller, a user-actuated backup signaling subsystem, a user-notifying device comprising first and second notifying states, and a data storage controller host interface adapted for communication with the host system.

The method comprises receiving a first signal from the user-actuated backup signaling subsystem; communicating the first signal to the host system via the host interface; receiving an acknowledgement signal from the host system in response to the communicating; and switching the user-notifying device between the first notifying state and the second notifying state in response to the received acknowledgement signal.

This invention can also be regarded as a method for performing backup operations from a host system, the back up operations corresponding to backing up of data to a peripheral data storage system in communication with the host system. The method comprises receiving in the host system a first request from the peripheral data storage system for performing a task corresponding to a host-scheduled backup operation for a scheduled backing up of data to the peripheral data storage system; completing the task by the host system based on the received first request; and notifying the peripheral data storage system of the completion of the task by the host system.

DETAILED DESCRIPTION OF THE INVENTION

Figure 1A:
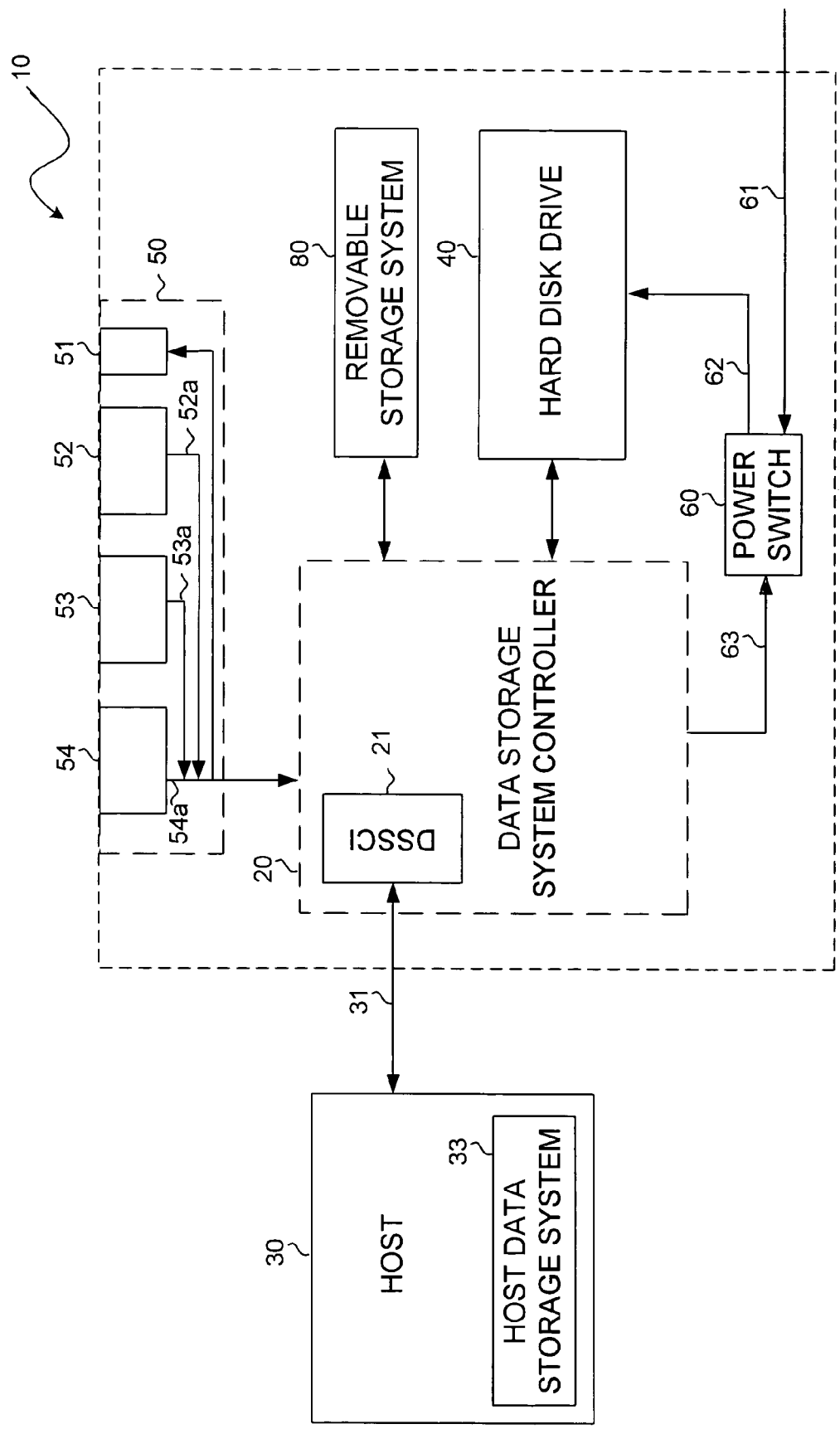
FIGS. 1A-C each illustrate an exemplary hard disk drive system in which an embodiment of the present invention may be practiced.
Figure 1B:
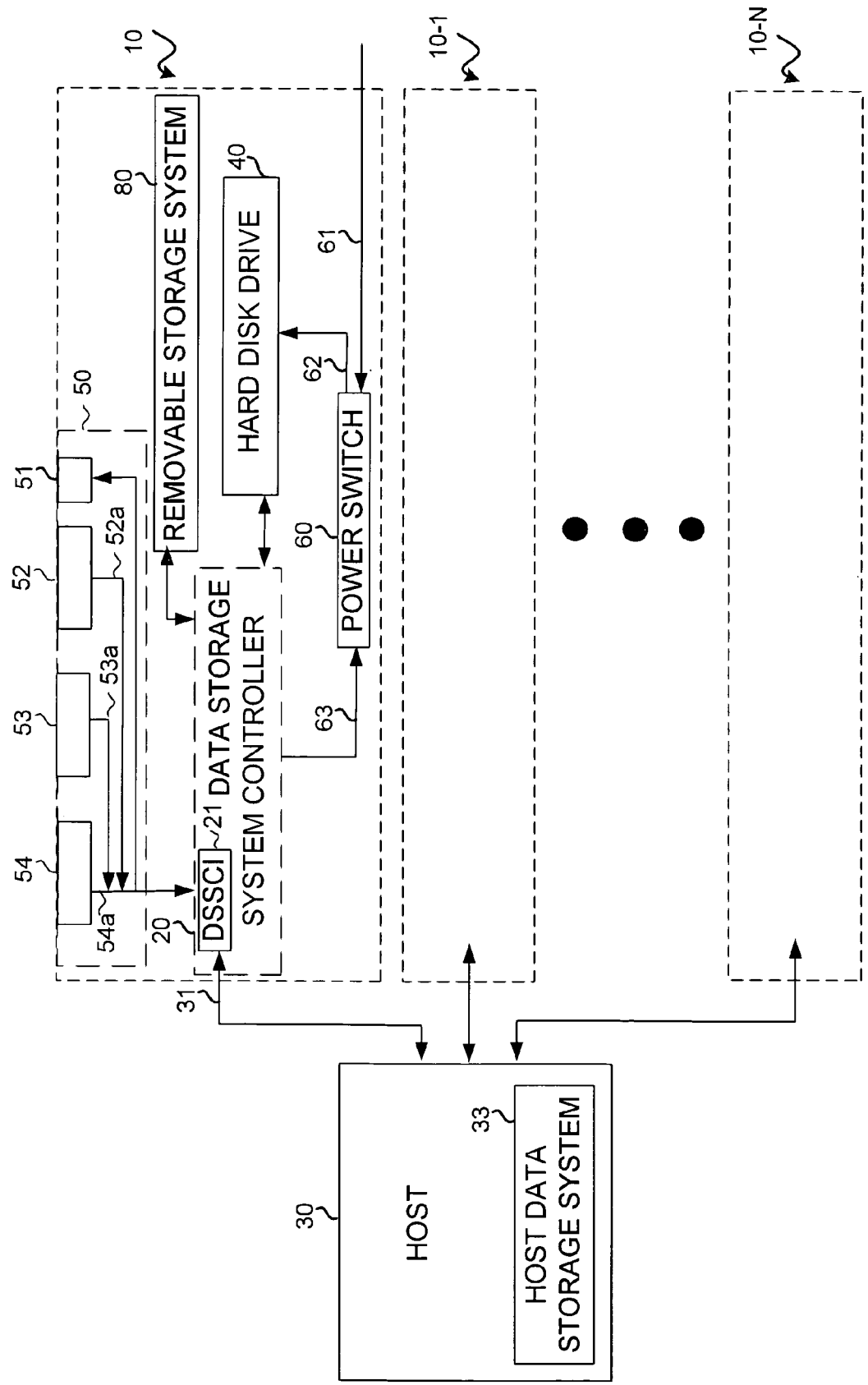
Figure 1C:
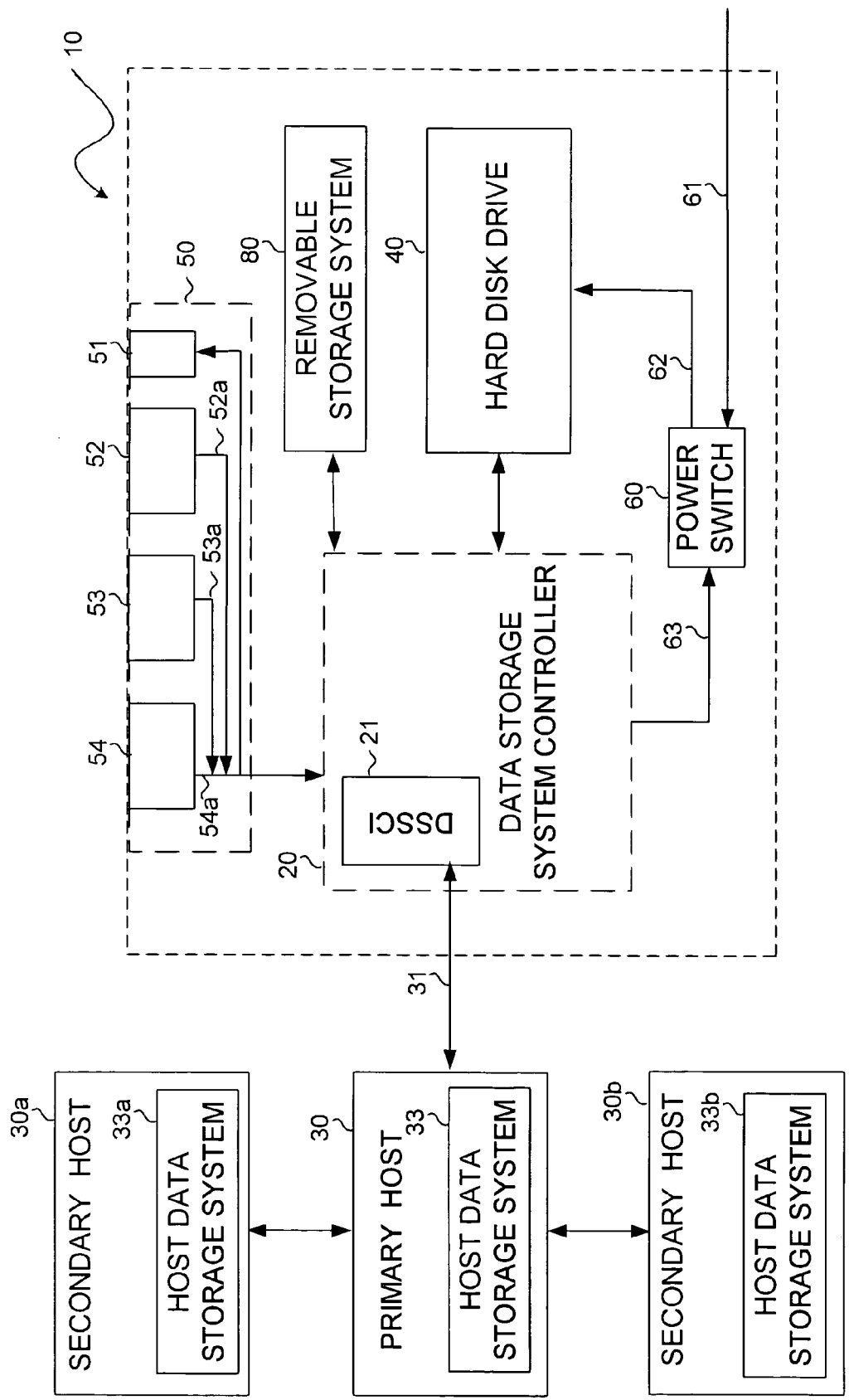

With reference to FIGS. 1A-C, an exemplary peripheral data storage system 10 is shown in which the method of the present invention for operating a peripheral data storage system 10 for use with a host system 30 configured to perform scheduled backup operations to the peripheral data storage system 10 may be practiced. As shown in FIGS. 1A-C the peripheral data storage system 10, such as an external disk drive system, comprises a data storage device 40 such as a hard disk drive, a data storage system controller 20, a user-actuated backup signaling subsystem 50, a user-notifying device 51 comprising first and second notifying states, and a data storage controller host interface 21 adapted for communication with the host system 30. Suitably, the user-actuated backup signaling subsystem 50 comprises electro-mechanical switches 52, 53 and 54. The peripheral data storage system 10 is further adapted for communication with the host system 30 via the data storage controller host interface 21, such as a bridge controller host interface, and communication medium 31, such as a cable, suitably a universal serial bus (USB) cable or a Firewire™ cable. Suitably, the host system 30 is configured via a user-programmable scheduling software. During the operations of the data storage device 40, the data storage system controller 20 transmits command 63 to the power switch 60 for providing the data storage device 40 with a DC operating current 62 inputted via line 61 from an external power source (not shown).

Figure 2A:
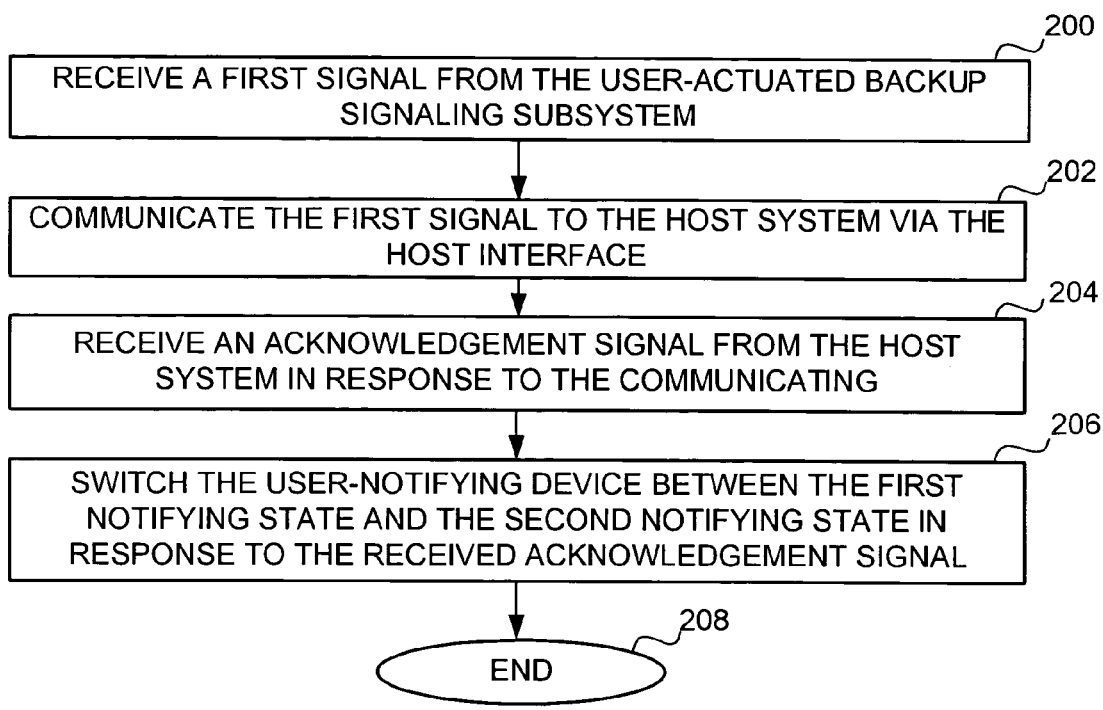
FIGS. 2A-C are flow charts illustrating processes used in the embodiment of the invention shown in FIG. 1A.
Figure 2B:
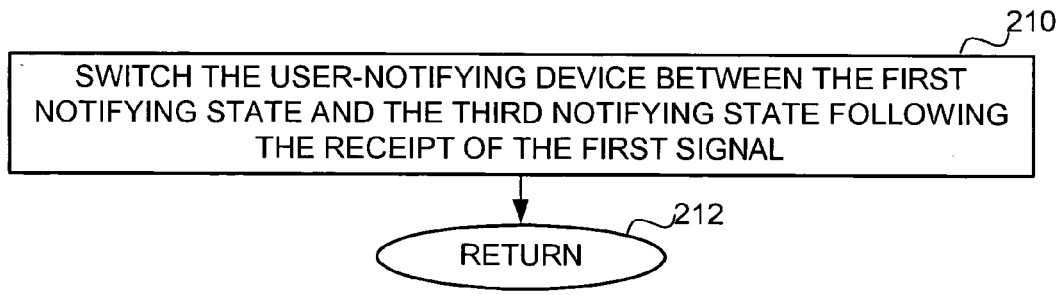
Figure 2C:
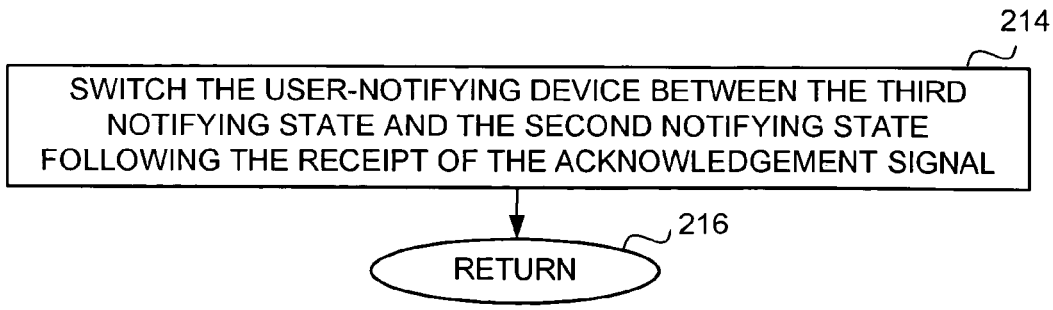

FIGS. 2A-C are flow charts illustrating processes used in the embodiment of the invention shown in FIG. 1A. As shown in FIG. 2A, the process begins in block 200 wherein a signal 52a is received from the user-actuated backup signaling subsystem 50, such as from the button 52. Suitably, the button 52 is adapted to receive a user-inputted request and wherein the user-actuated backup signaling subsystem 50 is adapted to generate the signal 52a based on the user-inputted request. Next, in block 202, the signal 52a is communicated to the host system 30 via the host interface 21. Next, in block 204, an acknowledgement signal is received from the host system 30 in response to the communicating of block 202. Next, in block 206, the user-notifying device 51 is switched between the first notifying state and the second notifying state in response to the received acknowledgement signal. Suitably, the user-notifying device 51 comprises a user-visible display device, such as a light emitting device such as a light emitting diode (LED) having first, second display states, and adapted to display the first and second display states in the form of a first and a second displaying of emitted light, such as first state of a steady emission of light, and a second state of an absence of emission of light. The flow then proceeds to block 208 in which the overall process ends.

In an exemplary embodiment, the user-notifying device 51 comprises a third notifying state. In this exemplary embodiment, the foregoing method of the present invention as shown in FIG. 2A, includes the exemplary aspects shown in FIGS. 2B-C. As shown in FIG. 2B, the process begins in block 210 wherein the user-notifying device 51 is switched between the first notifying state and the third notifying state following the receipt of the signal 52a. In this exemplary embodiment, the user-notifying device 51 comprises a user-visible display device having a third display state and adapted to display the third display state in the form of a third displaying of emitted light, such as a pre-selected flashing pattern. The flow then proceeds to block 212 for returning to block 200 of FIG. 2A. As shown in FIG. 2C, the method of FIG. 2A may further include the process beginning in block 214 of FIG. 2C, wherein the user-notifying device 51 is switched between the third notifying state and the second notifying state following the receipt of the acknowledgement signal. The flow then proceeds to block 216 for returning to block 204 of FIG. 2A.

The user-notifying device 51 may also suitably comprise a user-audible audio device having first, second and third audible states, and adapted to project first, second and third audible tones corresponding to the first, second and third audible states. The user-notifying device 51 may further suitably comprise a user-visible display device comprising an alpha-numeric display having first, second and third display states, and adapted to display the first, second and third display states in the form of a first, a second and a third displaying of alpha-numeric characters.

Figure 3A:
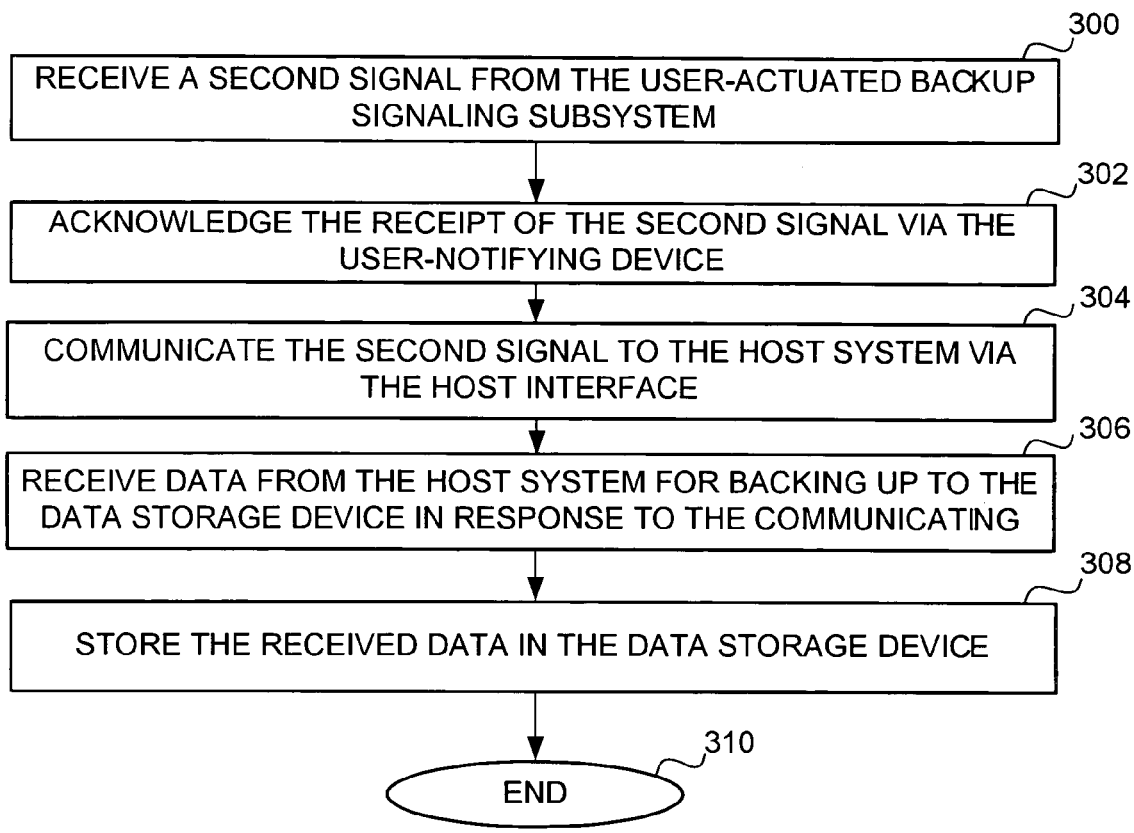
FIGS. 3A-B are flow charts illustrating other processes used in the embodiment of the invention shown in FIG. 1A.
Figure 3B:
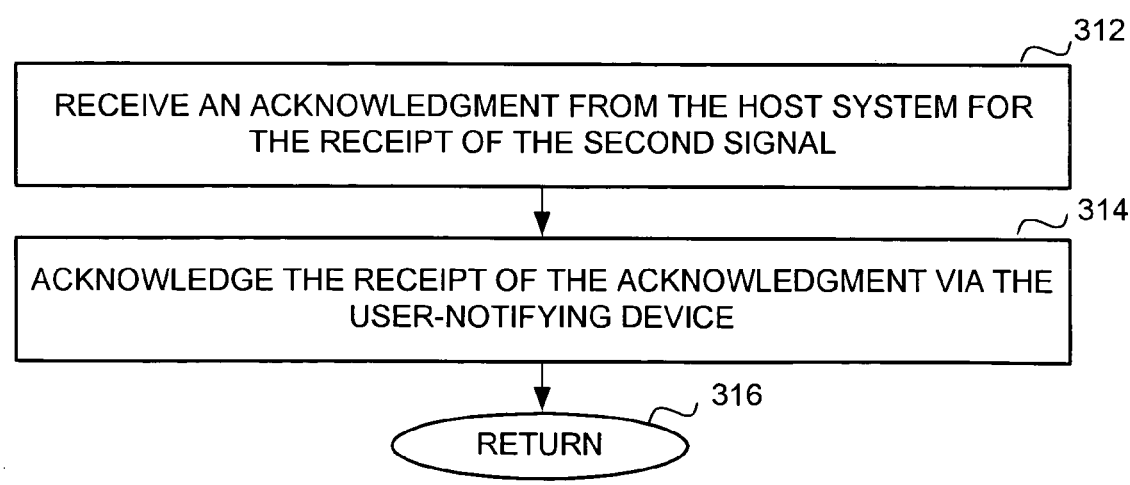

FIGS. 3A-B are flow charts illustrating other processes used in the embodiment of the invention shown in FIG. 1A. As shown in FIG. 3A, the process begins in block 300 in which a signal 53a is received from the user-actuated backup signaling subsystem 50, such as from the button 53. Suitably, the button 53 is adapted to receive a user-inputted request and wherein the user-actuated backup signaling subsystem 50 is adapted to generate the signal 53a based on the user-inputted request. Next, in block 302, the receipt of the signal 53a is acknowledged to the user via the user-notifying device 51, such as in the form of a displaying of emitted light, such as a pre-selected flashing pattern. Next, in block 304, the signal 53a is communicated to the host system 30 via the host interface 21. Next, in block 306, data is received from the host system 30, in response to the communicating, for backing up to the data storage device 40. Suitably, the received data is from a host data storage system 33 or a removable data storage system 80, such as a removable memory card, adapted for communication with at least one of the host system 30 and the peripheral data storage system 10. Next, in block 308, the received data is stored in the data storage device 40. The flow then proceeds to block 310 in which the overall process ends.

Figure 4:
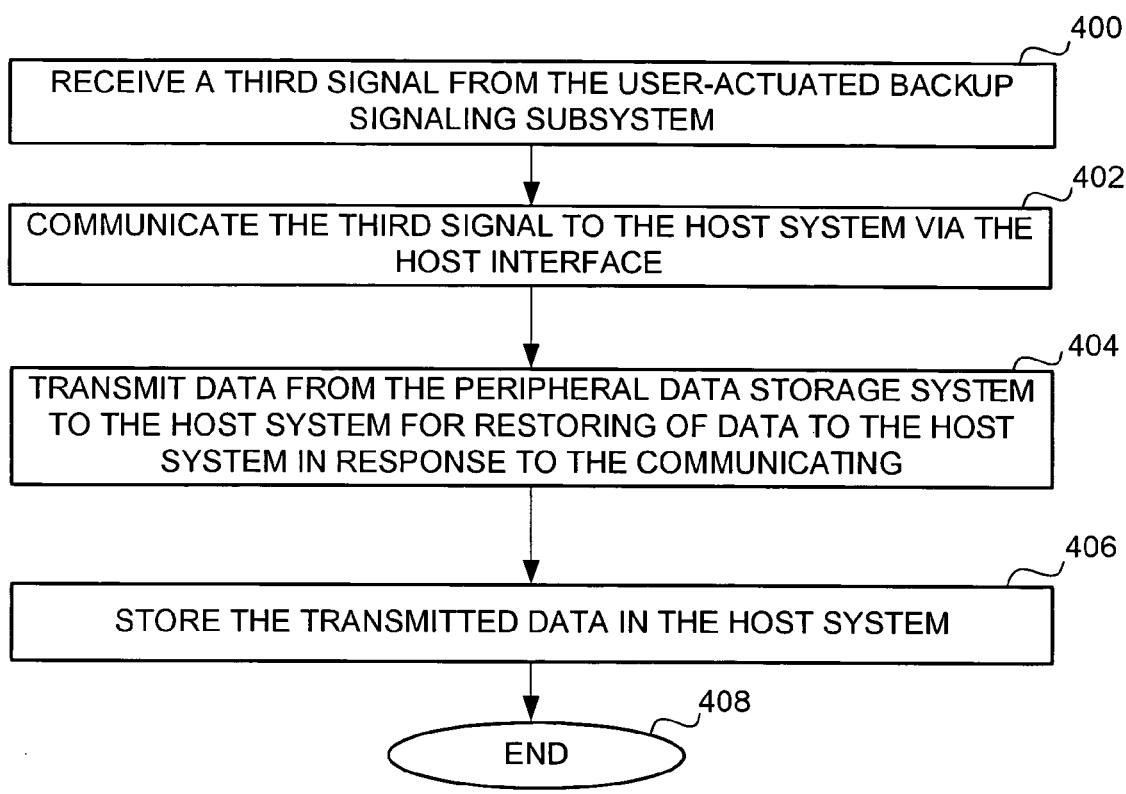
FIG. 4 is a flow chart illustrating yet another process used in the embodiment of the invention shown in FIG. 1A.

FIG. 3B illustrates in greater detail the communication process of block 304 in FIG. 3A. As shown in FIG. 3B, the process begins in block 312 wherein an acknowledgment is received from the host system 30 following the receipt of the signal 53a. Next, in block 314, the receipt of the acknowledgment from host system 30 is acknowledged to the user via the user-notifying device 51. The flow then proceeds to block 316 for returning to block 304 of FIG. 3A, FIG. 4 is a flow chart illustrating yet another process used in the embodiment of the invention shown in FIG. 1A. As shown in FIG. 4, the process begins in block 400 in which a signal 54a is received from the user-actuated backup signaling subsystem 50, such as from the button 54. Suitably, the button 54 is adapted to receive a user-inputted request and wherein the user-actuated backup signaling subsystem 50 is adapted to generate the signal 54a based on the user-inputted request. Next, in block 402, the signal 54a is communicated to the host system 30 via the host interface 21. Next, in block 404, data is transmitted from the peripheral data storage system 10 to the host system 30 for restoring of data to the host system 30. Next, in block 308, the transmitted data is stored in the host system 30, such as in the host data storage system 33. The flow then proceeds to block 408 in which the overall process ends.

Figure 5:
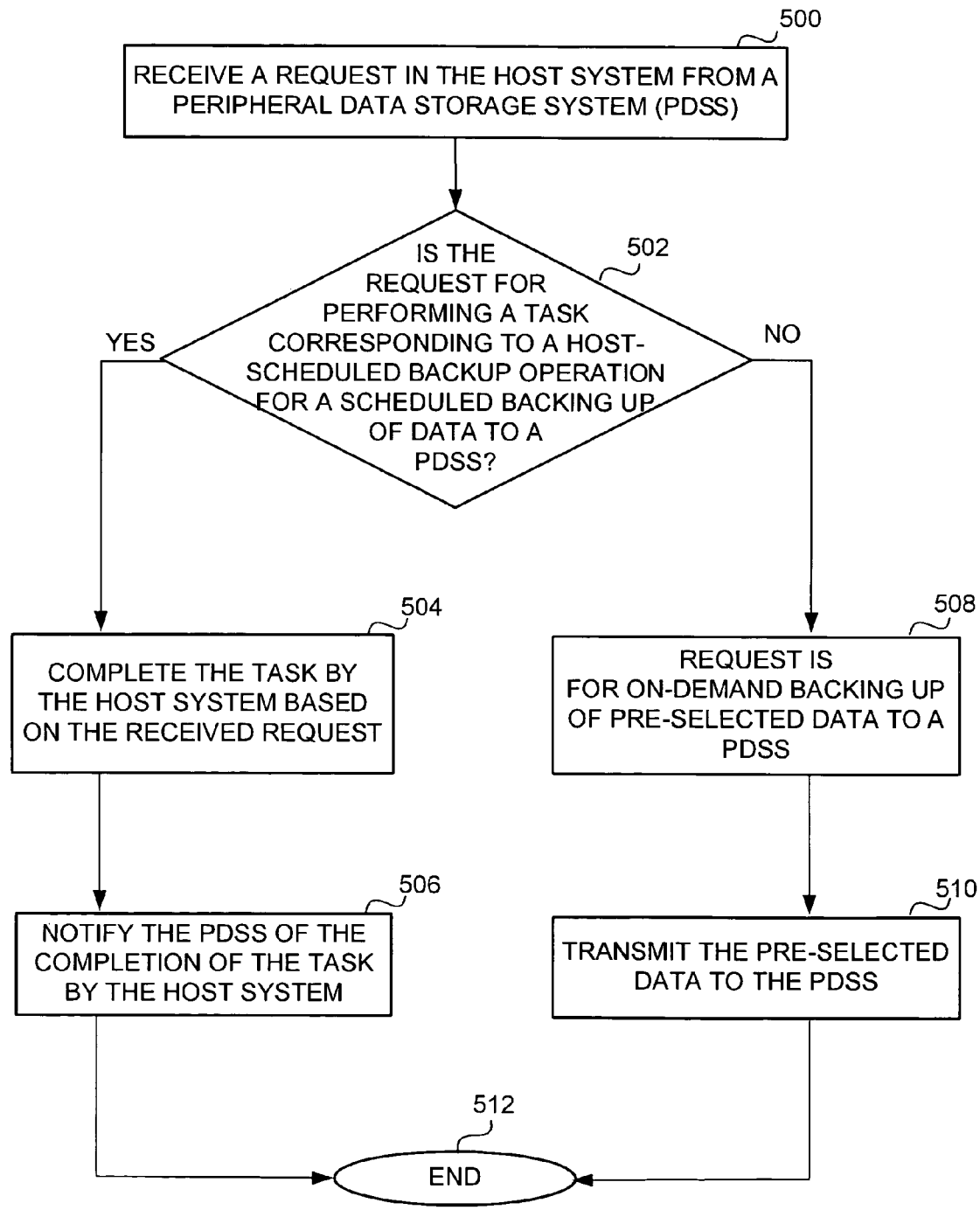
FIG. 5 is a flow chart illustrating processes used in the embodiments of the invention shown in FIGS. 1A-B.

FIG. 5 is a flow chart illustrating additional processes used in the embodiments of the invention shown in FIGS. 1A-B. FIG. 1B illustrates another exemplary peripheral data storage system 10 in which the method of the present invention for operating a peripheral data storage system 10 for use with a host system 30 configured to perform scheduled backup operations to the peripheral data storage system 10 may be practiced. As shown in FIG. 1B, the host system 30 is in communication with a plurality of additional peripheral data storage systems 10-1 through 10-N, wherein each of the peripheral data storage systems 10-1 through 10-N have a corresponding host-scheduled backup operation configured in host system 30.

FIG. 5 illustrates the process for performing backup operations corresponding to backing up of data from a host system 30 to the peripheral data storage system 10, or also to peripheral data storage systems 10-1 through 10-N in communication with the host system 30. As shown, the process begins in block 500 wherein a request is received in the host system 30 from one of the peripheral data storage system 10, or peripheral data storage systems 10-1 through 10-N, as described below in greater detail in conjunction with FIG. 6A and FIG. 7A. Next, in decision block 502 it is determined if the received request is a first request for performing a task corresponding to a host-scheduled backup operation for a scheduled backing up of data to one of the peripheral data storage systems 10 or 10-1 through 10-N. Suitably, the task comprises an enabling or disabling of the host-scheduled backup operation. If in decision block 502 it is determined that the received request is the foregoing first request, the flow then proceeds to block 504, wherein the task is completed by the host system 30 based on the received first request, as described below in greater detail in conjunction with FIG. 6A. The flow the proceeds to block 506 in which the appropriate one of the peripheral data storage systems 10 or 10-1 through 10-N is notified of the completion of the task by the host system 30. The flow then proceeds to block 512 in which the overall process ends. Returning to decision block 502, if it is determined that the received request is not the foregoing first request, the flow then proceeds to block 508, in which the request is deemed a second request for performing an on-demand backing up of pre-selected data to one of the peripheral data storage systems 10 or 10-1 through 10-N, as described below in greater detail in conjunction with FIG. 6B. Next, in block 510, the pre-selected data is transmitted to the appropriate one of the peripheral data storage systems 10 or 10-1 through 10-N. The flow then proceeds to block 512 in which the overall process ends.

Figure 6A:
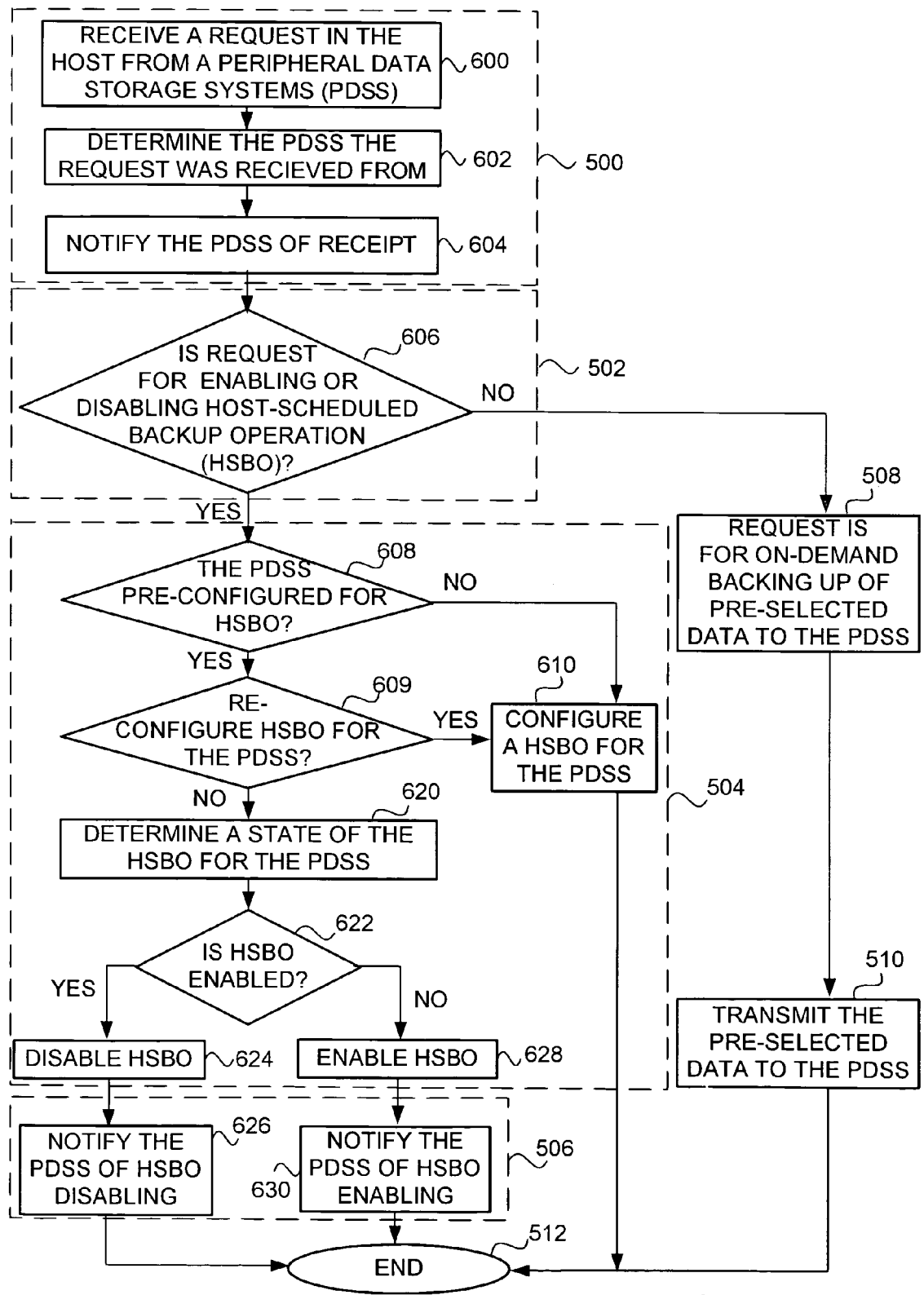
FIGS. 6A-B are flow charts further illustrating processes used in conjunction with the process shown in FIG. 5.

FIG. 6A is a flow chart describing in greater detail the processes shown in blocks 500, 502, 504 and 506 of FIG. 5 as practiced in the embodiments of the invention shown in FIGS. 1A-B. As shown in FIG. 6A, the process begins in block 600 wherein a request is received in the host system 30 from one of the peripheral data storage systems 10 or 10-1 through 10-N in communication with the host system 30. Next, in block 602, the host system 30 determines the peripheral data storage system 10 or 10-1 through 10-N from which the request was received. To better illustrate the workings of the present invention, an exemplary request is determined to have been received from the peripheral data storage system 10 and used throughout the detailed description. Next, in block 604, a notification is sent from the host system 30 to the determined peripheral data storage system 10 to notify the peripheral data storage system 10 of the receipt of the request. Suitably, the notification is in the form of a signal provided to the peripheral data storage system 10 for notifying the user via the user-notifying device 51, such as by a flashing pattern displayed by the light emitting device.

Next, in decision block 606, it is determined if the request is for an enabling or disabling of the host-scheduled backup operation for performing a scheduled backing up of data to the peripheral data storage system 10. If it is determined that the request is for an enabling or disabling of the host-scheduled backup operation, such as for example a request corresponding to the signal 52a described in conjunction with FIG. 1A above, the flow then proceeds to decision block 608. In decision block 608, the host system 30 determines if the peripheral data storage system 10 was pre-configured for a host-scheduled backup operation. Suitably, the host-scheduled backup operations for each of the peripheral data storage systems 10 and 10-1 through 10-N are configured in the host system 30 prior to the receipt of the enabling or disabling request, in which case the flow then proceeds to decision block 609 wherein the user is queried to see if the user desires to reconfigure the host-scheduled backup operation of the peripheral data storage system 10. Suitably, the querying is performed by presenting a query-window to the user from a display device of the host system 30 for a predetermined time interval, such as ten seconds, during which the user can either input a request to reconfigure, or simply ignore the query in which case the process will proceed to block 620 in FIG. 6A. If in decision block 608 the peripheral data storage system 10 was not pre-configured for a host-scheduled backup operation, or if in decision block 609 the user inputs a request to reconfigure, the flow then proceeds to block 610 in which a new host-scheduled backup operation is configured for the peripheral data storage system 10 as described below in greater detail in conjunction with FIG. 6B. The flow then proceeds to block 512 in which the overall process ends.

Returning to decision block 609, if the user does not input a request to reconfigure, the flow then proceeds to block 620 in which an enabled or disabled state of the host-scheduled backup operation for the peripheral data storage system 10 is determined. Next, if in decision block 622 the host-scheduled backup operation was determined to be in an enabled state, then the flow proceeds to block 624 in which the host-scheduled backup operation for the peripheral data storage system 10 is disabled. The flow then proceeds to block 626 in which the peripheral data storage system 10 is notified of the disabling of the host-scheduled backup operation for the peripheral data storage system 10. Suitably the notifying comprises providing a signal by the host interface 21 for notifying the user via the user-notifying device 51. Suitably, as described in block 206 of FIG. 2A, the signal causes the user-notifying device 51 to switch from a first notifying state, such a steady emission of light by the light emitting device, to a second notifying state, such as a turned off state of the light emitting device. The flow then proceeds to block 512 in which the overall process ends.

Returning to decision block 622, if the host-scheduled backup operation was determined to be in a disabled state, then the flow proceeds to block 628 in which the host-scheduled backup operation for the peripheral data storage system 10 is enabled. The flow then proceeds to block 630 in which the peripheral data storage system 10 is notified of the enabling of the host-scheduled backup operation for the peripheral data storage system 10. Suitably the notifying comprises providing a signal by the host interface 21 for notifying the user via the user-notifying device 51. Suitably, as described in block 206 of FIG. 2A, the signal causes the user-notifying device 51 to switch from a first notifying state, such as an absence of emitted light by the light emitting device, to a second notifying state, such as a steady emission of light by the light emitting device. The flow then proceeds to block 512 in which the overall process ends.

Figure 6B:
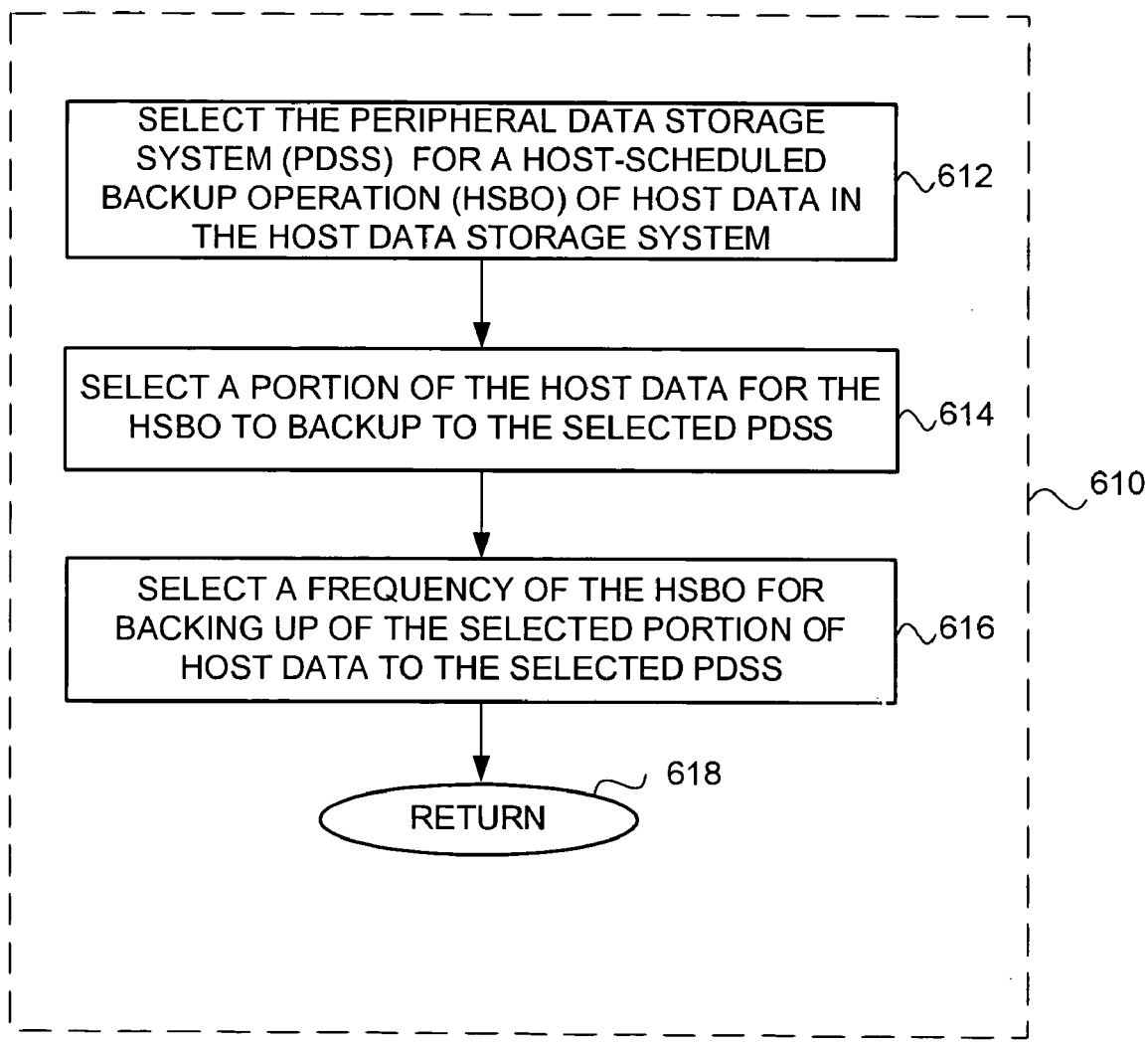

FIG. 6B illustrates in greater detail the configuration process of block 610 in FIG. 6A. As shown in FIG. 6B, the process begins in block 612 wherein the peripheral data storage system 10 is selected for a host-scheduled backup operation of host data in the host data storage system 33. Next, in block 614, a portion of the host data is selected for the host-scheduled backup operation to backup to the selected peripheral data storage system 10. Next, in block 616, a frequency of the host-scheduled backup operation for backing up of the selected portion of host data to the selected peripheral data storage system 10 is selected. The flow then proceeds to block 618 for returning to block 610 of FIG. 6A. Suitably, the above process is also used during the pre-configuring of each of the peripheral data storage systems 10 and 10-1 through 10-N.

Figure 7A:
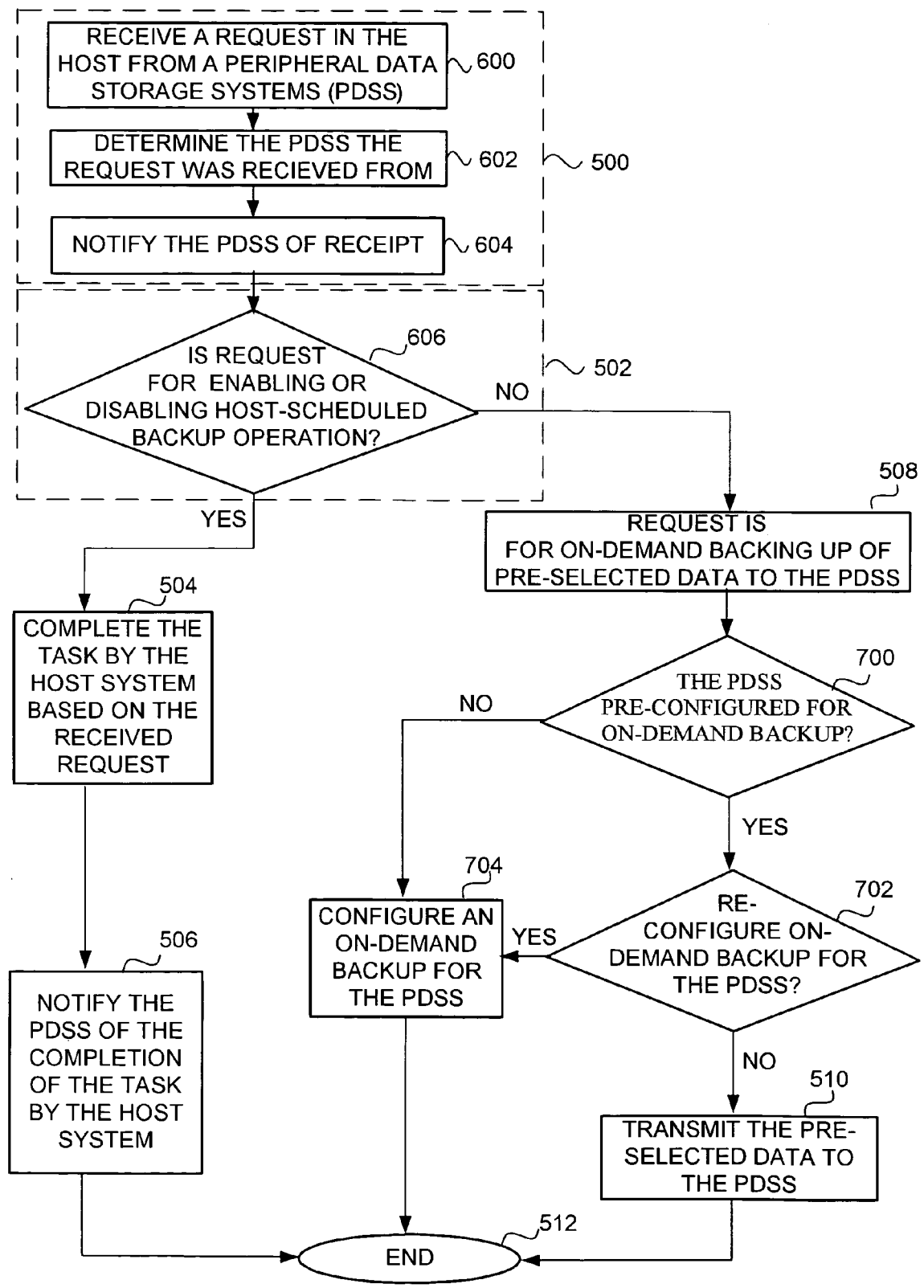
FIGS. 7A-B are flow charts further illustrating processes used in conjunction with the process shown in FIG. 5.
Figure 7B:
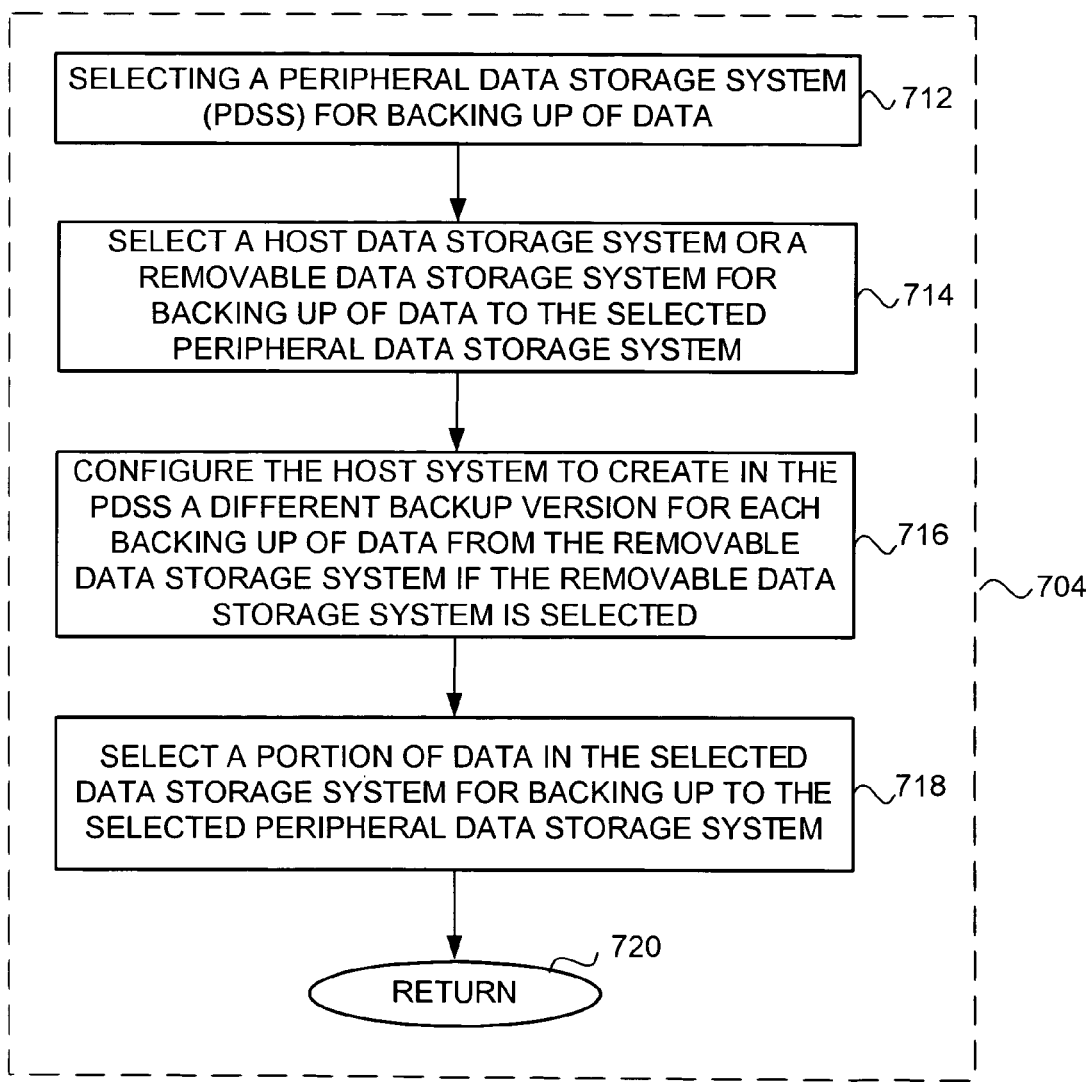

FIGS. 7A-B are flow charts illustrating further processes used in conjunction with the on-demand backing up of data to the peripheral data storage system 10 shown in blocks 508 and 510 of FIG. 5. As shown in FIG. 7A, the process begins in block 600 wherein a request is received in the host system 30 from a peripheral data storage system 10, or peripheral data storage systems 10-1 through 10-N in communication with the host system 30. Next, in block 602, the host system 30 determines the peripheral data storage system 10 or 10-1 through 10-N from which the request was received. To better illustrate the workings of the present invention, an exemplary request is determined to have been received from the peripheral data storage system 10 and used throughout the detailed description. Next, in block 604, a notification is sent from the host system 30 to the determined peripheral data storage system 10 to notify the peripheral data storage system 10 of the receipt of the request. Suitably, the notification is in the form of a signal provided to the peripheral data storage system 10 for notifying the user via the user-notifying device 51, such as by a flashing pattern displayed by the light emitting device.

Next, in decision block 606, it is determined if the request is for an enabling or disabling of the host-scheduled backup operation for performing a scheduled backing up of data to the peripheral data storage system 10. If it is determined that the request is for an enabling or disabling of the host-scheduled backup operation, such as for example a request corresponding to the signal 52a described in conjunction with FIG. 1A above, the flow then proceeds to decision block 608 in the manner described above in conjunction with FIG. 6A. If in decision block 606 it is determined that the request is not for an enabling or disabling of the host-scheduled backup operation, then the flow proceeds to block 508 in which the request is deemed a second request for performing an on-demand backing up of pre-selected data to the peripheral data storage system 10.

Next, the flow proceeds to decision block 700 in which the host system 30 determines if the peripheral data storage system 10 was pre-configured in the host system 30 for on-demand backing up of pre-selected data to the peripheral data storage system 10. Suitably, the on-demand backing up of pre-selected data to each of the peripheral data storage systems 10 and 10-1 through 10-N are configured in the host system 30 prior to the receipt of the second request, in which case the flow then proceeds to decision block 702 wherein the user is queried to see if the user desires to reconfigure the on-demand backing up of pre-selected data of the peripheral data storage system 10. Suitably, the querying is performed by presenting a query-window to the user from a display device of the host system 30 for a predetermined time interval, such as ten seconds, during which the user can either input a request to reconfigure, or simply ignore the query in which case the process will proceed to block 510 in FIG. 7A. If in decision block 700 the peripheral data storage system 10 was not pre-configured for a on-demand backing up of pre-selected data, or if in decision block 702 the user inputs a request to reconfigure, the flow then proceeds to block 704 in which a new on-demand backing up of pre-selected data is configured for the peripheral data storage system 10 as described below in greater detail in conjunction with FIG. 7B. The flow then proceeds to block 512 in which the overall process ends. If in decision block 702 the user does not input a request to reconfigure, the flow then proceeds to block 510 in which the pre-selected data is transmitted to the peripheral data storage system 10. The flow then proceeds to block 512 in which the overall process ends.

FIG. 7B illustrates in greater detail the configuration process of block 704 in FIG. 7A. As shown in FIG. 7B, the process begins in block 712 wherein the peripheral data storage system 10 is selected for an on-demand backing up of data to the peripheral data storage system 10. Next, in block 714, a host data storage system 33 or a removable data storage system 80 (such as a removable memory card) is selected for backing up of data to the selected peripheral data storage system 10. Next, in block 716, if the removable data storage system 80 is selected, then the host system 30 is configured to create in the peripheral data storage system 10 a different backup version for each backing up of data from the removable data storage system 80. Next, in block 718, a portion of data in the selected data storage system 33 or 80 is selected for backing up to the selected peripheral data storage system 10. The flow then proceeds to block 720 for returning to block 704 of FIG. 6A. Suitably, the above process is also used during the pre-configuring of each of the peripheral data storage systems 10 and 10-1 through 10-N.

One advantage of the foregoing feature of the present invention over the prior art is that by configuring the host system 30 to create in the peripheral data storage system 10 a different backup version for each backing up of data from the removable data storage system 80, the risk of deleting existing data having the same file names as, but different in content, than the newly downloaded data is minimized.

Figure 8A:
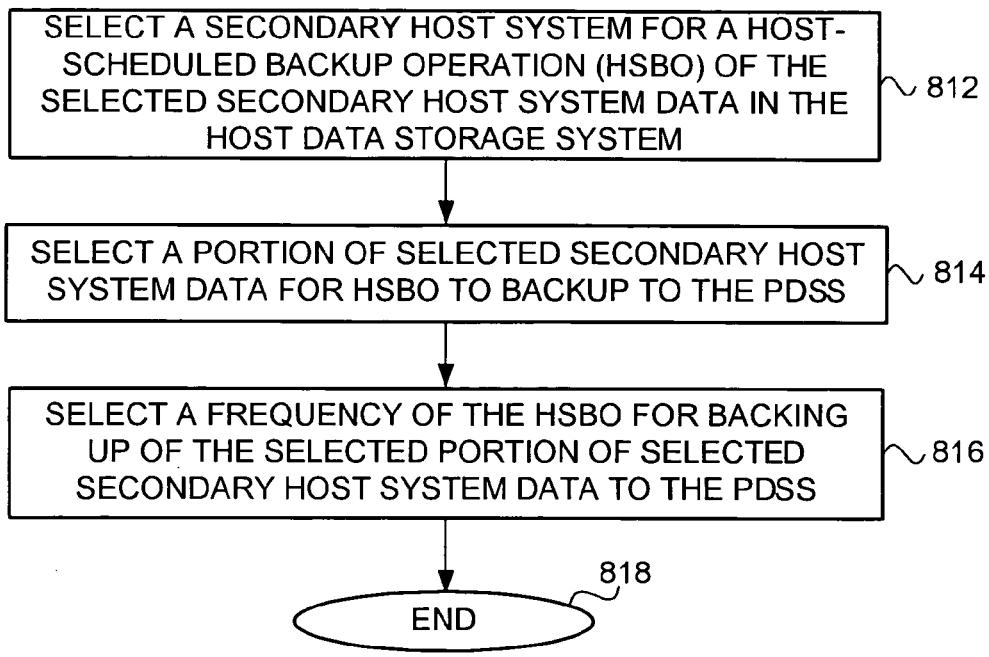
FIGS. 8A-B are flow charts illustrating processes used in the embodiment of the invention shown in FIG. 1C.
Figure 8B:
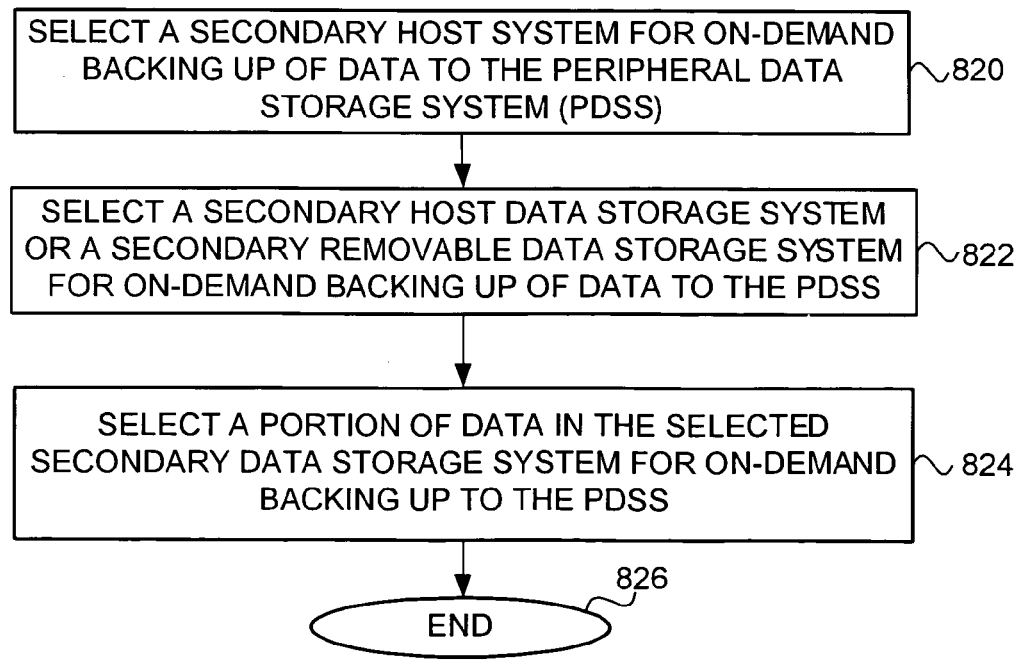

FIGS. 8A-B describe the processes used in the embodiment of the invention shown in FIG. 1C. FIG. 1C illustrates another exemplary peripheral data storage system 10 in which the method of the present invention for operating a peripheral data storage system 10 for use with a host system 30 configured to perform scheduled backup operations to the peripheral data storage system 10 may be practiced. As shown in FIG. 1C, the host system 30 is a primary host system in communication with a plurality of secondary host systems such as 30a and 30b, and adapted to receive data from the secondary host systems 30a and 30b for an scheduled or on-demand backing up to the peripheral data storage system 10 pursuant to the receipt of a request from the peripheral data storage system 10 in the manner described above in conjunction with FIG. 5.

FIG. 8A describes in greater detail the configuring of each host-scheduled backup operation corresponding to the primary host system 30 and each of the secondary host system 30a and 30b in the primary host system 30. The process begins in block 812 in which a secondary host system such as 30a is selected for a host-scheduled backup operation of data in the host data storage system 33a of the selected secondary host system 30a. Next, in block 814, a portion of selected data in the secondary host system 30a is selected for the host-scheduled backup operation to backup to the peripheral data storage system 10. Next, in block 816, a frequency of the host-scheduled backup operation for backing up of the selected portion of selected secondary host system 30a data to the peripheral data storage system 10 is selected. The flow then proceeds to block 818 wherein the overall configuring process ends. Suitably, the foregoing configuring of the host-scheduled backup operations corresponding to the primary host system 30 and each of the secondary host systems 30a and 30b in the primary host system 30 are performed prior to the receipt of a request from the peripheral data storage system 10.

FIG. 8B describes in greater detail the configuring of each on-demand backing up of data corresponding to the primary host system 30 and each of the secondary host systems 30a and 30b in the primary host system 30. The process begins in block 820 in which a secondary host system such as 30a is selected for on-demand backing up of data to the peripheral data storage system 10. Next, in block 822, a secondary host data storage system 33a or a secondary removable data storage system (not shown) of the secondary host system 30a is selected for on-demand backing up of data to the peripheral data storage system 10. Next, in block 824, a portion of data in the selected secondary data storage systems, such as in the secondary host data storage system 33a or a secondary removable data storage system (not shown), is selected for on-demand backing up to the peripheral data storage system 10. The flow then proceeds to block 826 wherein the overall configuring process ends. Suitably, the foregoing configuring of the on-demand backing up corresponding to the primary host system 30 and each of the secondary host systems 30a and 30b in the primary host system 30 are performed prior to the receipt of a request from the peripheral data storage system 10.

It should be noted that the various features of the foregoing embodiments were discussed separately for clarity of description only and they can be incorporated in whole or in part into a single embodiment of the invention having all or some of these features. It should further be noted that the invention is not limited to the foregoing exemplary peripheral data storage systems but can be readily used in conjunction with virtually any peripheral data storage system adapted for bi-directional communication with a host system via an interface.

What is claimed is:

1. A method of operating a peripheral data storage system for use with a host system configured to perform scheduled backup operations to the peripheral data storage system, the peripheral data storage system comprising a data storage device, a data storage system controller, a user-actuated backup signaling subsystem, a user-notifying device comprising first and second notifying states, and a data storage controller host interface adapted for communication with the host system, the method comprising:
receiving a first signal from the user-actuated backup signaling subsystem;
communicating the first signal to the host system via the host interface;
receiving an acknowledgement signal from the host system in response to the communicating; and
switching the user-notifying device between the first notifying state and the second notifying state in response to the received acknowledgement signal.

2. The method of claim 1, wherein the user-notifying device comprises a third notifying state and wherein the method further comprising:
switching the user-notifying device between the first notifying state and the third notifying state following the receipt of the first signal; and
switching the user-notifying device between the third notifying state and the second notifying state following the receipt of the acknowledgement signal.

3. The method of claim 2, wherein the user-notifying device comprises a user-visible display device having first, second and third display states, and adapted to display the first, second and third display states in the form of a first, a second and a third displaying of emitted light.

4. The method of claim 3, wherein the third displaying of emitted light comprises a flashing pattern.

5. The method of claim 1, wherein the user-notifying device comprises a user-audible audio device having first, second and third audible states, and adapted to project first, second and third audible tones corresponding to the first, second and third audible states.

6. The method of claim 3, wherein the user-visible display device comprises an alpha-numeric display having first, second and third display states, and adapted to display the first, second and third display states in the form of a first, a second and a third displaying of alpha-numeric characters.

7. The method of claim 1, wherein the host system is configured via a user-programmable scheduling software.

8. The method of claim 1, further comprising:
receiving a second signal from the user-actuated backup signaling subsystem;
communicating the second signal to the host system via the host interface;
receiving data from the host system for backing up to the data storage device in response to the communicating; and
storing the received data in the data storage device.

9. The method of claim 8, further comprising:
acknowledging the receipt of the second signal via the user-notifying device prior to the communicating.

10. The method of claim 8, wherein the communicating further comprises:
receiving an acknowledgment from the host system following the receipt of the second signal; and
acknowledging the receipt of the acknowledgment via the user-notifying device.

11. The method of claim 8, wherein the backing up of data to the peripheral data storage system is from a host data storage system.

12. The method of claim 8, wherein the backing up of data to the peripheral data storage system is from a removable data storage system adapted for communication with at least one of the host system and the peripheral data storage system.

13. The method of claim 12, wherein the removable data storage system comprises a removable memory card.

14. The method of claim 8, wherein the user-actuated backup signaling subsystem comprises a first electro-mechanical switch and a second electro-mechanical switch.

15. The method of claim 14, wherein the first electro-mechanical switch comprises a first button adapted to receive a first user-inputted request and wherein the user-actuated backup signaling subsystem is adapted to generate the first signal based on the first user-inputted request.

16. The method of claim 14, wherein the second electro-mechanical switch comprises a second button adapted to receive a second user-inputted request and wherein the user-actuated backup signaling subsystem is adapted to generate the second signal based on the second user-inputted request.

17. The method of claim 1, wherein the data storage controller host interface is adapted for communication with the host via at least one of a universal serial bus (USB) cable and a Firewire™ cable.

18. The method of claim 1, wherein the peripheral data storage system comprises a disk drive system and wherein the data storage device is a disk drive.

19. The method of claim 1, further comprising:
receiving a third signal from the user-actuated backup signaling subsystem;
communicating the third signal to the host system via the host interface;
transmitting data from the peripheral data storage system to the host system for restoring of data to the host system in response to the communicating; and
storing the transmitted data in the host system.

20. The method of claim 19, wherein the peripheral data storage system comprises a third electro-mechanical switch adapted to receive a third user-inputted request and wherein the user-actuated backup signaling subsystem is adapted to generate the third signal based on the third user-inputted request.

21. A method for performing backup operations from a host system, the back up operations corresponding to backing up of data to a peripheral data storage system in communication with the host system, the method comprising:
receiving in the host system a first request from the peripheral data storage system for performing a task corresponding to a host-scheduled backup operation for a scheduled backing up of data to the peripheral data storage system;
completing the task by the host system based on the received first request; and
notifying the peripheral data storage system of the completion of the task by the host system.

22. The method of claim 21, wherein the task comprises an enabling of the host-scheduled backup operation.

23. The method of claim 21, wherein the task comprises a disabling of the host-scheduled backup operation.

24. The method of claim 21, wherein the completing further comprises:
determining a state of the host-scheduled backup operation subsequent to the receipt of the first request;
enabling the host-scheduled backup operation if the host-scheduled backup operation is in a disabled state; else
disabling the host-scheduled backup operation if the host-scheduled backup operation is in an enabled state.

25. The method of claim 21, further comprising:
notifying the peripheral data storage system of the receipt of the first request prior to the completing.

26. The method of claim 25, wherein the notifying the peripheral data storage system of the receipt of the first request prior to the completing comprises providing a first signal to the peripheral data storage system.

27. The method of claim 24, wherein the notifying the peripheral data storage system of the completion of the task by the host system further comprises:
providing a third signal to the user by the data storage controller host interface if the scheduled backup operation is enabled.

28. The method of claim 24, wherein the notifying the peripheral data storage system of the completion of the task by the host system further comprises:
providing a fourth signal to the user by the data storage controller host interface if the scheduled backup operation is disabled.

29. The method of claim 21, further comprising:
configuring the host-scheduled backup operations in the host system prior to the receipt of the first request.

30. The method of claim 21, the completing further comprising:
determining if the host-scheduled backup operations was configured in the host system prior to the receipt of the first request; and
configuring in the host system the host-scheduled backup operations if the host-scheduled backup operations was not configured prior to the receipt of the first request.

31. The method of claim 30, wherein configuring the host-scheduled backup operations further comprises:
selecting the peripheral data storage system for the host-scheduled backup operations of host data in a host data storage system;
selecting a portion of host data for the host-scheduled backup operations of the selected portion to the selected peripheral data storage system; and
selecting a frequency of the host-scheduled backup operation for the selected portion of host data to the selected peripheral data storage system.

32. The method of claim 30, wherein the configuring the host-scheduled backup operation further comprises:
reconfiguring the previously configured host-scheduled backup operations subsequent to the receipt of the first request.

33. The method of claim 21, further comprising:
receiving in the host system a second request from the peripheral data storage system for performing an on-demand backing up of pre-selected data to the peripheral data storage system; and
transmitting the pre-selected data to the peripheral data storage system.

34. The method of claim 33, further comprising:
notifying the peripheral data storage system of the receipt of the second request prior to the transmitting.

35. The method of claim 33, further comprising:
configuring the on-demand backing up of data to the peripheral data storage system in the host system prior to the receipt of the second backup request.

36. The method of claim 33, the further comprising:
determining if the on-demand backing up of data to the peripheral data storage system was configured in the host system prior to the receipt of the second request; and
configuring in the host system the on-demand backing up of data to the peripheral data storage system if the on-demand backing up of data to the peripheral data storage system was not configured prior to the receipt of the second request.

37. The method of claim 36, wherein configuring the on-demand backing up of data to the peripheral data storage system further comprises:
selecting the peripheral data storage system for the on-demand backing up of data to the selected peripheral data storage system;
selecting at least one of a host data storage system and a removable data storage system for on-demand backing up of data to the peripheral data storage system; and
selecting a portion of data in the selected data storage system for on-demand backing up of data to the selected peripheral data storage system.

38. The method of claim 36, wherein the configuring the on-demand backing up of data to the peripheral data storage system further comprises:
reconfiguring the previously configured on-demand backing up of data to the peripheral data storage system subsequent to the receipt of the second request.

39. The method of claim 37, wherein the removable data storage system comprises a removable memory card.

40. The method of claim 36, wherein the configuring further comprises configuring the host system to create in the peripheral data storage system a different backup version for each backing up of data from the removable data storage system.

41. The method of claim 34, wherein the notifying the peripheral data storage system of the receipt of the second request further comprises providing a second signal to the peripheral data storage system.

42. The method of claim 21, wherein the host system is in communication with a plurality of peripheral data storage systems each having a corresponding host-scheduled backup operation, and wherein the first request is received from a first peripheral data storage system for performing a first task corresponding to a host-scheduled backup operation for a scheduled backing up of data to the first peripheral data storage system.

43. The method of claim 42, further comprising:
determining the first request is received from the first peripheral data storage system.

44. The method of claim 43, wherein the completing further comprises:
completing the first task by the host system based on the received first request.

45. The method of claim 44, wherein the notifying further comprises:
notifying the first peripheral data storage system of the completion of the first task by the host system.

46. The method of claim 42, further comprising:
configuring each host-scheduled backup operation corresponding to each peripheral data storage system in the host system prior to the receipt of the first request.

47. The method of claim 46, wherein configuring each host-scheduled backup operation corresponding to each peripheral data storage system further comprises:
selecting a peripheral data storage system for a host-scheduled backup operation of host data in the host data storage system;
selecting a portion of the host data for the host-scheduled backup operation to backup to the selected peripheral data storage system; and
selecting a frequency of the host-scheduled backup operation for backing up of the selected portion of host data to the selected peripheral data storage system.

48. The method of claim 33, wherein the host system is in communication with a plurality of peripheral data storage systems, and wherein the second request is received from a first peripheral data storage system for performing a first on-demand backing up of data to the first peripheral data storage system.

49. The method of claim 48, further comprising:
determining the second request is received from the first peripheral data storage system.

50. The method of claim 49, wherein the transmitting further comprises:
transmitting the pre-selected data to the first peripheral data storage system.

51. The method of claim 48, further comprising:
configuring each on-demand backing up of data corresponding to each peripheral data storage system in the host system prior to the receipt of the second request.

52. The method of claim 51, wherein the configuring each on-demand backing up of data corresponding to each peripheral data storage system in the host system further comprises:
selecting a peripheral data storage system for an on-demand backing up of data to the peripheral data storage system;
selecting at least one of a host data storage system and a removable data storage system for backing up of data to the selected peripheral data storage system; and
selecting a portion of data in the selected data storage system for backing up to the selected peripheral data storage system.

53. The method of claim 21, wherein the host system comprises a primary host system in communication with a plurality of secondary host systems, and wherein the first request is received in the primary host system from the peripheral data storage system for performing a second task corresponding to a host-scheduled backup operation for a scheduled backing up of data from the primary host system and the plurality of secondary host systems to the peripheral data storage system.

54. The method of claim 53, further comprising:
configuring each host-scheduled backup operation corresponding to the primary host system and each of the secondary host systems in the primary host system prior to the receipt of the first request.

55. The method of claim 54, wherein configuring each host-scheduled backup operation corresponding to the primary host system and each of the secondary host systems further comprises:
selecting a secondary host system for a host-scheduled backup operation of the selected secondary host system data in the host data storage system;
selecting a portion of selected secondary host system data for the host-scheduled backup operation to backup to the peripheral data storage system; and
selecting a frequency of the host-scheduled backup operation for backing up of the selected portion of selected secondary host system data to the peripheral data storage system.

56. The method of claim 32, wherein the host system comprises a primary host system in communication with a plurality of secondary host systems, and wherein the second request is received in the primary host system from the peripheral data storage system for performing an on-demand backing up of data from the primary host system and the plurality of secondary host systems to the peripheral data storage system.

57. The method of claim 56, further comprising:
configuring each on-demand backing up of data corresponding to the primary host system and each of the secondary host systems in the primary host system prior to the receipt of the second request.

58. The method of claim 57, wherein the configuring each on-demand backing up of data corresponding to the primary host system and each of the secondary host systems in the primary host system further comprises:
selecting a secondary host system for on-demand backing up of data;
selecting at least one of a secondary host data storage system and a secondary removable data storage system for on-demand backing up of data to the peripheral data storage system; and
selecting a portion of data in the selected secondary data storage system for on-demand backing up to the peripheral data storage system.

* * * * *